US009507447B2

(12) United States Patent
Yilmaz

(10) Patent No.: US 9,507,447 B2
(45) Date of Patent: Nov. 29, 2016

(54) TOUCH SENSOR WITH INDUCTIVE CHARGING

(75) Inventor: Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 245 days.

(21) Appl. No.: 13/314,690

(22) Filed: Dec. 8, 2011

(65) Prior Publication Data

US 2013/0147720 A1 Jun. 13, 2013

(51) Int. Cl.
| | | |
|---|---|---|
| G06F 3/041 | (2006.01) | |
| H02J 17/00 | (2006.01) | |
| H02J 7/00 | (2006.01) | |
| G06F 1/16 | (2006.01) | |
| H02J 7/02 | (2016.01) | |

(52) U.S. Cl.
CPC ............. *G06F 3/041* (2013.01); *G06F 1/1635* (2013.01); *H02J 7/025* (2013.01)

(58) Field of Classification Search
CPC .... H04B 1/3883; H02J 7/0044; H02J 17/00; H04M 19/08; H04M 1/04
See application file for complete search history.

(56) References Cited

U.S. PATENT DOCUMENTS

| | | | | |
|---|---|---|---|---|
| 5,959,433 | A * | 9/1999 | Rohde | 320/108 |
| 7,065,658 | B1 * | 6/2006 | Baraban et al. | 713/300 |
| 7,663,607 | B2 | 2/2010 | Hotelling | |
| 7,875,814 | B2 | 1/2011 | Chen | |
| 7,920,129 | B2 | 4/2011 | Hotelling | |
| 7,989,936 | B2 * | 8/2011 | McCain | 257/678 |
| 8,031,094 | B2 | 10/2011 | Hotelling | |
| 8,031,174 | B2 | 10/2011 | Hamblin | |
| 8,040,326 | B2 | 10/2011 | Hotelling | |
| 8,049,732 | B2 | 11/2011 | Hotelling | |
| 8,099,140 | B2 * | 1/2012 | Arai | 455/573 |
| 8,179,381 | B2 | 5/2012 | Frey | |
| 8,354,821 | B2 * | 1/2013 | Cheng et al. | 320/108 |
| 8,373,559 | B2 * | 2/2013 | McCain | 340/540 |
| 2008/0055303 | A1 * | 3/2008 | Ikeda | 345/214 |
| 2008/0309287 | A1 * | 12/2008 | Reed | 320/108 |
| 2009/0167699 | A1 * | 7/2009 | Rosenblatt | G06F 3/044 345/173 |
| 2009/0315854 | A1 | 12/2009 | Matsuo | |
| 2010/0176834 | A1 * | 7/2010 | Chen et al. | 324/762 |
| 2010/0315389 | A1 * | 12/2010 | Sorrell | H01Q 1/22 345/204 |
| 2011/0050164 | A1 * | 3/2011 | Partovi et al. | 320/108 |
| 2011/0080373 | A1 * | 4/2011 | Wang et al. | 345/174 |
| 2011/0309792 | A1 * | 12/2011 | Mochida et al. | 320/108 |
| 2011/0311084 | A1 * | 12/2011 | Drader | 381/315 |
| 2012/0057322 | A1 * | 3/2012 | Waffenschmidt | 361/816 |
| 2012/0069506 | A1 * | 3/2012 | Lai et al. | 361/679.01 |

(Continued)

FOREIGN PATENT DOCUMENTS

WO WO 2012/129247 9/2012

OTHER PUBLICATIONS

U.S. Appl. No. 61/454,936, filed Mar. 21, 2011, Myers.

(Continued)

*Primary Examiner* — Kent Chang
*Assistant Examiner* — Benjamin Morales Fernandez
(74) *Attorney, Agent, or Firm* — Baker Botts L.L.P.

(57) ABSTRACT

In one embodiment, an apparatus includes a substrate, a flexible printed circuit (FPC), a touch sensor, and an inductive-charging element. The FPC is coupled to the substrate. The touch sensor is disposed on the substrate. The touch sensor includes electrodes made of conductive material. The inductive-charging component is disposed on the substrate or the FPC.

25 Claims, 6 Drawing Sheets

(56) References Cited

U.S. PATENT DOCUMENTS

| | | | |
|---|---|---|---|
| 2012/0119708 A1* | 5/2012 | Toya | H01F 38/14 |
| | | | 320/137 |
| 2012/0146857 A1* | 6/2012 | Wang | 343/702 |
| 2012/0207244 A1* | 8/2012 | Weinerth et al. | 375/316 |
| 2012/0223588 A1* | 9/2012 | Suzuki | 307/104 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2012/0309310 A1* | 12/2012 | Greuet | 455/41.1 |
| 2013/0308256 A1* | 11/2013 | Lehr et al. | 361/679.01 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
U.S. Appl. No. 13/331,893, filed Dec. 20, 2011, Yilmaz.

\* cited by examiner

TOUCH SENSOR WITH INDUCTIVE CHARGING

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch sensitive display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
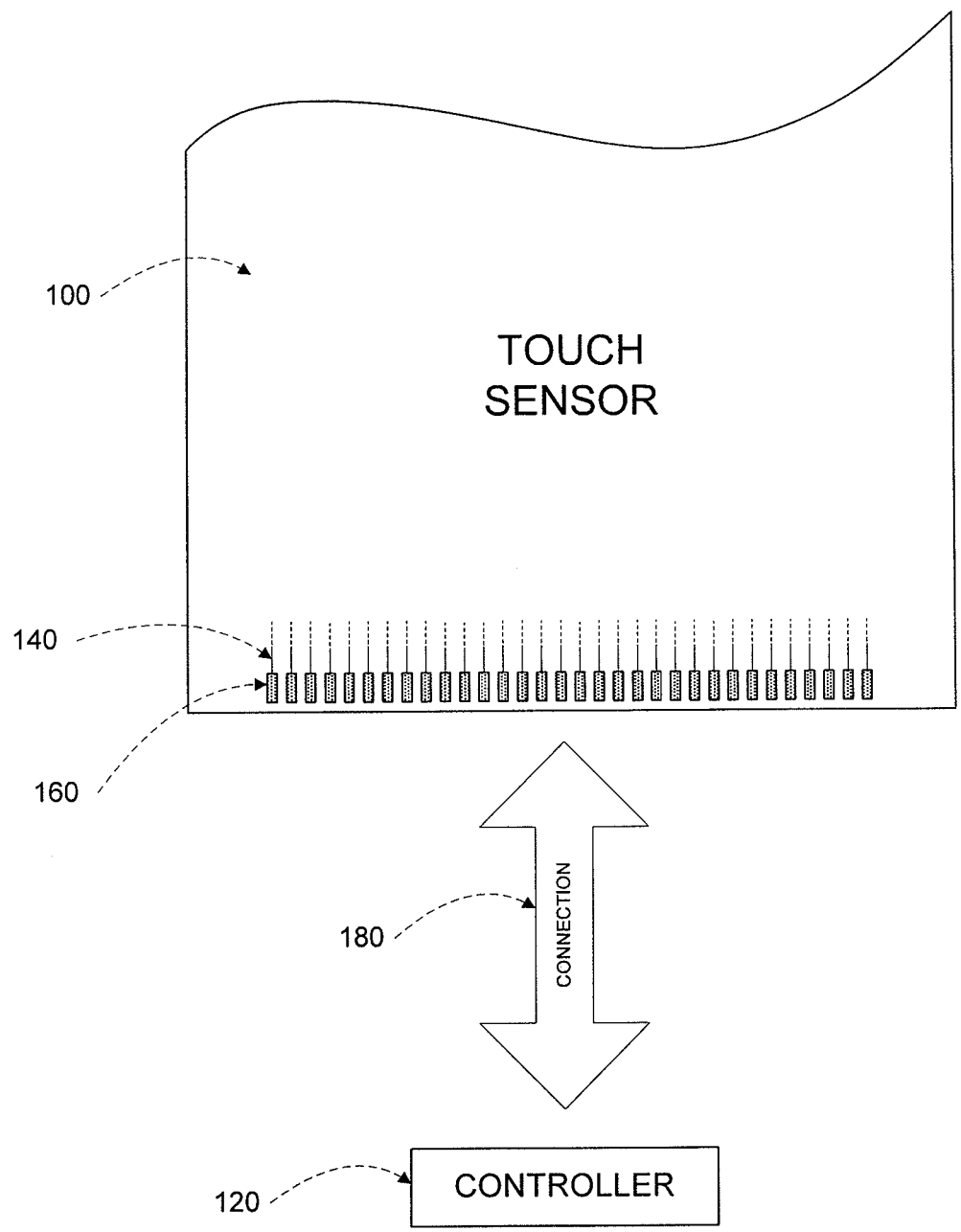
FIG. 1 illustrates an example touch sensor with an example touch-sensor controller.

FIG. 1 illustrates an example touch sensor 10 with an example touch-sensor controller 12. Touch sensor 100 and touch-sensor controller 120 may detect the presence and location of a touch or the proximity of an object within a touch-sensitive area of touch sensor 100. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 100 may include one or more touch-sensitive areas, where appropriate. Touch sensor 100 may include an array of drive and sense electrodes (or an array of electrodes of a single type) disposed on one or more substrates, which may be made of a dielectric material. Herein, reference to a substrate may encompass both a single layer of substrate material and a laminated structure of a plurality of substrates, where appropriate. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a drive electrode or a sense electrode) may be an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% (such as for example, approximately 5%) of the area of its shape. As an example and not by way of limitation, an electrode may be made of fine lines of metal or other conductive material (such as for example copper, silver, or a copper- or silver-based material) and the fine lines of conductive material may occupy substantially less than 100% (such as for example, approximately 5%) of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 100. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 100 and touch-sensor controller 120. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 100 may be made of polyethylene terephthalate (PET) or another suitable material. This disclosure contemplates any suitable substrate with any suitable portions made of any suitable material. In particular embodiments, the drive or sense electrodes in touch sensor 100 may be made of ITO in whole or in part. In particular embodiments, the drive or sense electrodes in touch sensor 100 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 100 may implement a capacitive form of touch sensing. In a mutual-capacitance implementation, touch sensor 100 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 120) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 120 may measure the change in capacitance. By measuring changes in capacitance throughout the array, touch-sensor controller 120 may determine the position of the touch or proximity within the touch-sensitive area(s) of touch sensor 100.

In a self-capacitance implementation, touch sensor 100 may include an array of electrodes of a single type that may each form a capacitive node. When an object touches or comes within proximity of the capacitive node, a change in self-capacitance may occur at the capacitive node and touch-sensor controller 120 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 120 may determine the position of the touch or proximity within the touch-sensitive area(s) of touch sensor 100. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 100 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 100 may have drive electrodes disposed in a pattern on one side of a substrate and sense electrodes disposed in a pattern on another side of the substrate. Moreover, touch sensor 100 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 100 may indicate a touch or proximity input at the position of the capacitive node. Touch-sensor controller 120 may detect and process the change in capacitance to determine the presence and location of the touch or proximity input. Touch-sensor controller 120 may then communicate information about the touch or proximity input to one or more other components (such one or more central processing units (CPUs) or digital signal processors (DSPs)) of a device that includes touch sensor 100 and touch-sensor controller 120, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 120 may be one or more integrated circuits (ICs)—such as for example general-purpose microprocessors, microcontrollers, programmable logic devices or arrays, application-specific ICs (ASICs). In particular embodiments, touch-sensor controller 120 comprises analog circuitry, digital logic, and digital non-volatile memory. In particular embodiments, touch-sensor controller 120 is disposed on a flexible printed circuit (FPC) bonded to the substrate of touch sensor 100, as described below. The FPC includes conductors that transmit electrical signals through the FPC. In particular embodiments, multiple touch-sensor controllers 120 are disposed on the FPC. In some embodiments, the FPC may have no touch-sensor controllers 120 disposed on it. The FPC may couple touch sensor 10 to a touch-sensor controller 12 located elsewhere, such as for example, on a printed circuit board of the device. Touch-sensor controller 120 may include a processor unit, a drive unit, a sense unit, and a storage unit. The drive unit may supply drive signals to the drive electrodes of touch sensor 100. The sense unit may sense charge at the capacitive nodes of touch sensor 100 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 100. The processor unit may also track changes in the position of a touch or proximity input within the touch-sensitive area(s) of touch sensor 100. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 140 of conductive material disposed on the substrate of touch sensor 100 may couple the drive or sense electrodes of touch sensor 100 to connection pads 160, also disposed on the substrate of touch sensor 100. As described below, connection pads 160 facilitate coupling of tracks 140 to touch-sensor controller 120. Tracks 140 may extend into or around (e.g. at the edges of) the touch-sensitive area(s) of touch sensor 100. Particular tracks 140 may provide drive connections for coupling touch-sensor controller 120 to drive electrodes of touch sensor 100, through which the drive unit of touch-sensor controller 120 may supply drive signals to the drive electrodes. Other tracks 140 may provide sense connections for coupling touch-sensor controller 120 to sense electrodes of touch sensor 100, through which the sense unit of touch-sensor controller 120 may sense charge at the capacitive nodes of touch sensor 100. Tracks 140 may be made of fine lines of metal or other conductive material. As an example and not by way of limitation, the conductive material of tracks 140 may be copper or copper-based and have a width of approximately 100 µm or less. As another example, the conductive material of tracks 140 may be silver or silver-based and have a width of approximately 100 µm or less. In particular embodiments, tracks 140 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 140, touch sensor 100 may include one or more ground lines terminating at a ground connector (which may be a connection pad 160) at an edge of the substrate of touch sensor 100 (similar to tracks 140).

Connection pads 160 may be located along one or more edges of the substrate, outside the touch-sensitive area(s) of touch sensor 100. As described above, touch-sensor controller 120 may be on an FPC. Connection pads 160 may be made of the same material as tracks 140 and may be bonded to the FPC using an anisotropic conductive film (ACF). Connection 180 may include conductive lines on the FPC coupling touch-sensor controller 120 to connection pads 160, in turn coupling touch-sensor controller 120 to tracks 140 and to the drive or sense electrodes of touch sensor 100. In another embodiment, connection pads 160 may be inserted into an electro-mechanical connector (such as a zero insertion force wire-to-board connector); in this embodiment, connection 180 may not need to include an FPC. This disclosure contemplates any suitable connection 180 between touch-sensor controller 120 and touch sensor 100.

As described below, one or more inductive-charging components may be disposed on a substrate of touch sensor 100, an FPC bonded to a substrate of touch sensor 100, or both. When the inductive-charging components (or a device containing them) are near a changing or alternating electromagnetic field, they may draw power from the electromagnetic field and convert it into electrical current to power or charge a component of the device, such as a battery, without the device being physically connected to a power source by a cable or wire. This disclosure contemplates any suitable number of any suitable inductive-charging components disposed on any suitable number of any suitable substrates of any suitable touch sensor; any suitable number of any suitable FPCs bonded to any suitable number of any suitable substrates of any suitable touch sensor.

One or more portions of an inductive-charging component may be made of fine lines of metal (such as for example copper, silver, or a copper- or silver-based material) or other conductive material. In particular embodiments one or more portions of the inductive-charging component may be made of metal (such as for example copper, silver, or a copper- or silver-based material) or other conductive material occupying approximately 100% of the area within the contours of the inductive-charging component and one or more portions of the metal or other conductive material of the inductive-charging component may have a width of approximately 100 µm or less. In particular embodiments, where appropriate, the fine lines of conductive material may be disposed in a hatched, mesh, or other suitable pattern within the contours of the inductive-charging component and may occupy approximately 5% of the area within the contours of the inductive-charging component. One or more portions of the fine lines of conductive material may have a thickness of approximately 1 µm or less and a width of approximately 10

µm or less. This disclosure contemplates any suitable inductive-charging component made of any suitable materials and having any suitable dimension(s) or shape(s).

In particular embodiments, the inductive-charging component may experience a magnetic flux field, such as for example, from a transmitter or magnetic coil. The magnetic flux field induces a voltage in the inductive-charging component. This voltage can be used to power or charge a component of the device. The efficiency of the power transfer between the inductive-charging component and the transmitter or magnetic coil depends on the quality of the inductive-charging component and the coupling it has with the transmitter or magnetic coil. In particular embodiments, the inductive-charging component may be shielded. The shield may be ferrous, ceramic, or any other suitable material. The shield may extend beyond the outer edges of the inductive-charging component.

The transmitter or magnetic component may be located external to touch sensor 10, such as for example, at a charging station or within a charging module. The transmitter or magnetic component may generate and transmit a magnetic field that is received by the inductive-charging component. The charging station or charging module may include several transmitters or magnetic coils to power or charge multiple devices. In particular embodiments, the charging station or module may power or charge the device using less than 5 Watts of electrical power.

The inductive-charging component may be made of the same material as one or more of the drive or sense electrodes of touch sensor 100, one or more tracks 140, or both, as appropriate. Moreover, in particular embodiments, the inductive-charging component may be disposed on a substrate of touch sensor 100, an FPC bonded to a substrate of touch sensor 100, or both during a manufacturing process along with and at substantially the same time as one or more of the drive or sense electrodes of touch sensor 100, one or more tracks 140, or both. If the inductive-charging component is made from a different material from both the touch sensor 100 and the tracks 140, then the component may be disposed on the substrate or FPC in a separate manufacturing step.

Figure 2A:
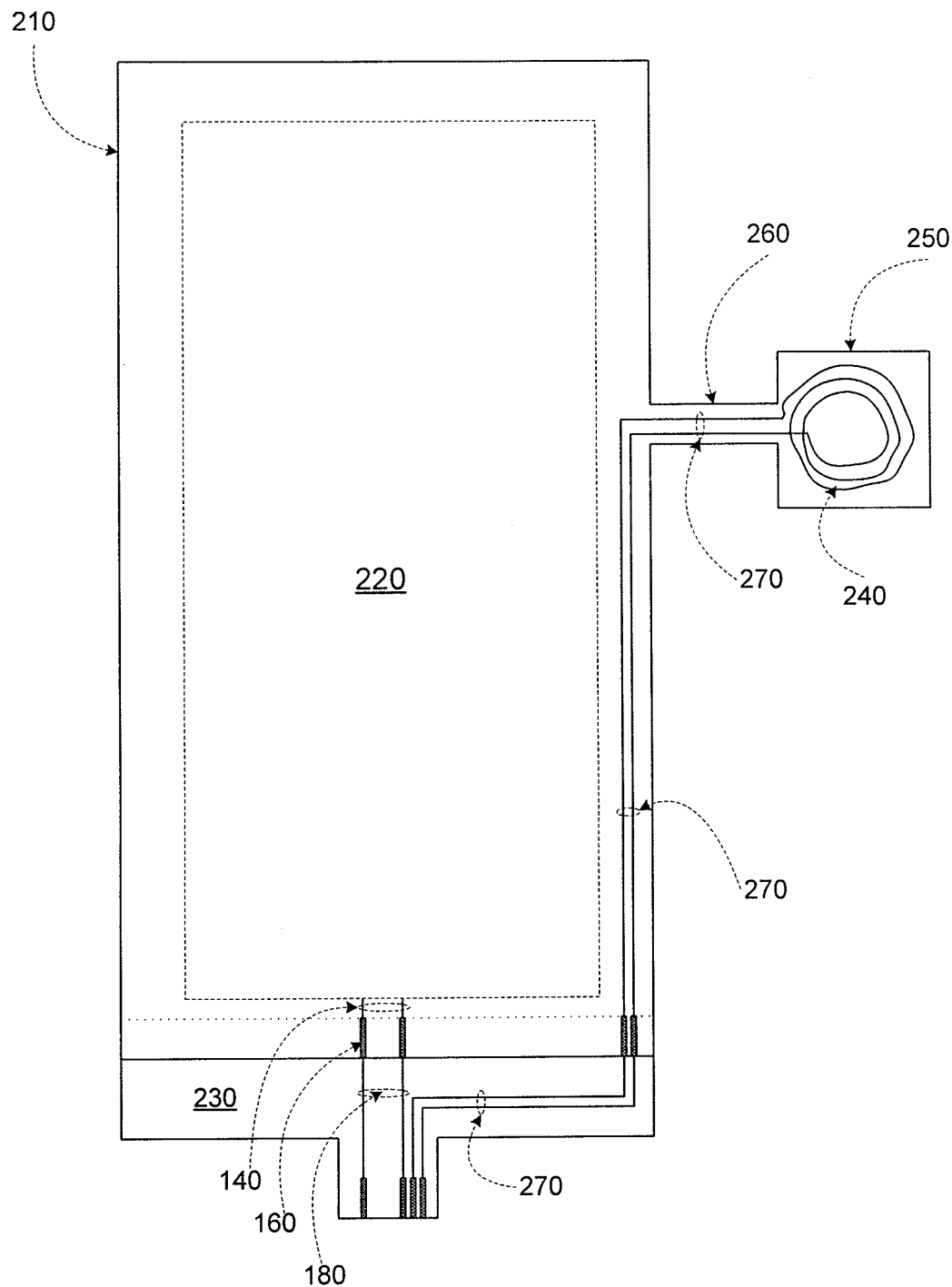
FIG. 2A illustrates an inductive-charging component on a touch-sensor substrate.

FIG. 2A (which is not necessarily drawn to scale) illustrates an inductive-charging component 240 on a touch-sensor substrate 210. As provided in FIG. 2A, there is a touch-sensitive area 220 on touch-sensor substrate 210 and touch-sensor substrate 210 includes a pad 250 and an extension 260. Pad 250 provides an area for inductive-charging component 240 and is physically connected to touch-sensor substrate 210 by extension 260. Touch-sensor substrate 210, pad 250, and extension 260 are made of the same material and formed from a contiguous segment of the material. The material of touch-sensor substrate 210, pad 250, or extension 260 is substantially flexible in one or more places, enabling one or more portions of pad 250 or extension 260 to substantially wrap around one or more edges of a device containing touch-sensor substrate 210, from one surface of the device to another. Pad 250 is polygonal (such as for example square or rectangular) in shape and has surface area for accommodating inductive-charging component 240. In particular embodiments, the use of pad 250 to provide an area for inductive-charging component 240 saves space and materials and facilitates the device's manufacture as compared to a device which has an inductive-charging component independent of, and separate from, the touch sensor. Wires 270 (one or more portions of which are made of the same material as inductive-charging component 240) extend across extension 260, along an edge of touch-sensor substrate 210, and electrically couple inductive-charging component 240 to device electronics for powering the device, or charging or otherwise managing the operation of one or more batteries or other components of a device containing touch-sensor substrate 210.

Figure 2B:
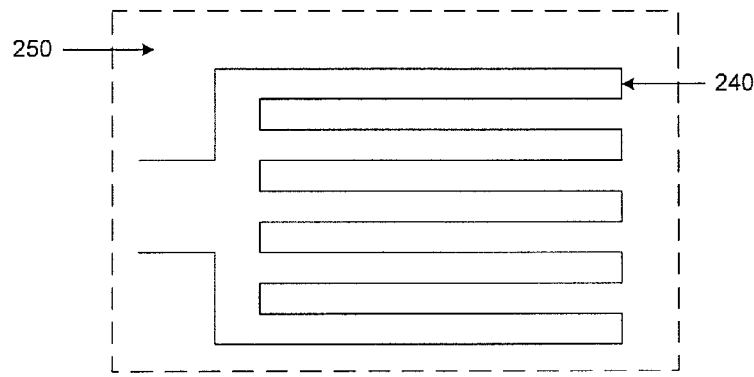
FIG. 2B illustrates an example inductive-charging component made of fine lines of metal or other conductive material.
Figure 2C:
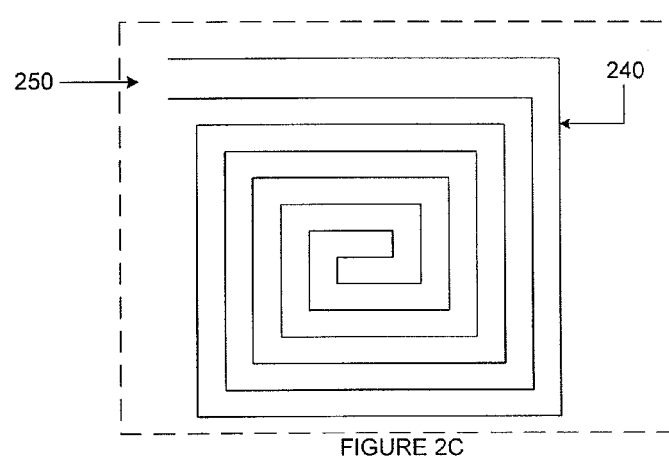
FIG. 2C illustrates another example inductive-charging component made of fine lines of metal or other conductive material.
Figure 2D:
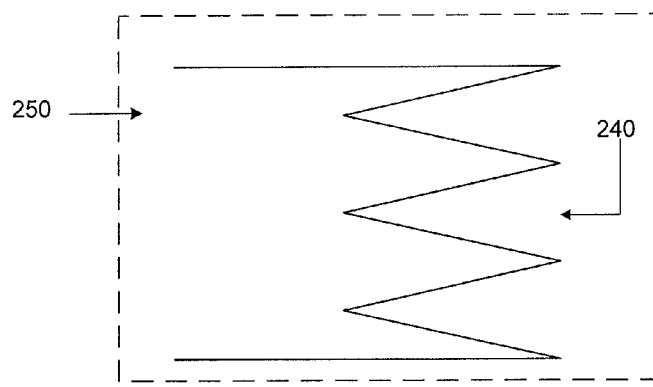
FIG. 2D illustrates another example inductive-charging component made of fine lines of metal or other conductive material.

A wide variety of inductive-charging component pattern designs are suitable, depending on the application. Although a coiled, or looped, conductor design may be used in particular embodiments of the inductive-charging component, other embodiments may be suitable. FIGS. 2B-D illustrate other example inductive-charging components 240. In FIG. 5B, the inductive-charging component 240 includes a repeating rectangular pattern resembling the prongs of a fork. In FIG. 5C, the inductive-charging component 240 includes a rectangular, double spiral pattern where an inwardly spiraling loop (starting from the outside of the spiral) spirals towards the center of the component and then spirals back out towards the outside of the loop. In FIG. 5D, the inductive-charging component 240 includes a repeating triangular pattern.

Although this disclosure describes particular device electronics providing particular functionality of a particular device, this disclosure contemplates any suitable device electronics providing any suitable functionality of any suitable device. Although this disclosure describes and illustrates pad 250 as having a particular size and a particular shape and being made of a particular material, this disclosure contemplates pad 250 having any suitable size and any suitable shape and being made of any suitable material. Although this disclosure describes the inductive-charging component 240 including particular shapes or patterns, this disclosure contemplates the inductive-charging component 240 including any suitable shapes or patterns.

Figure 3:
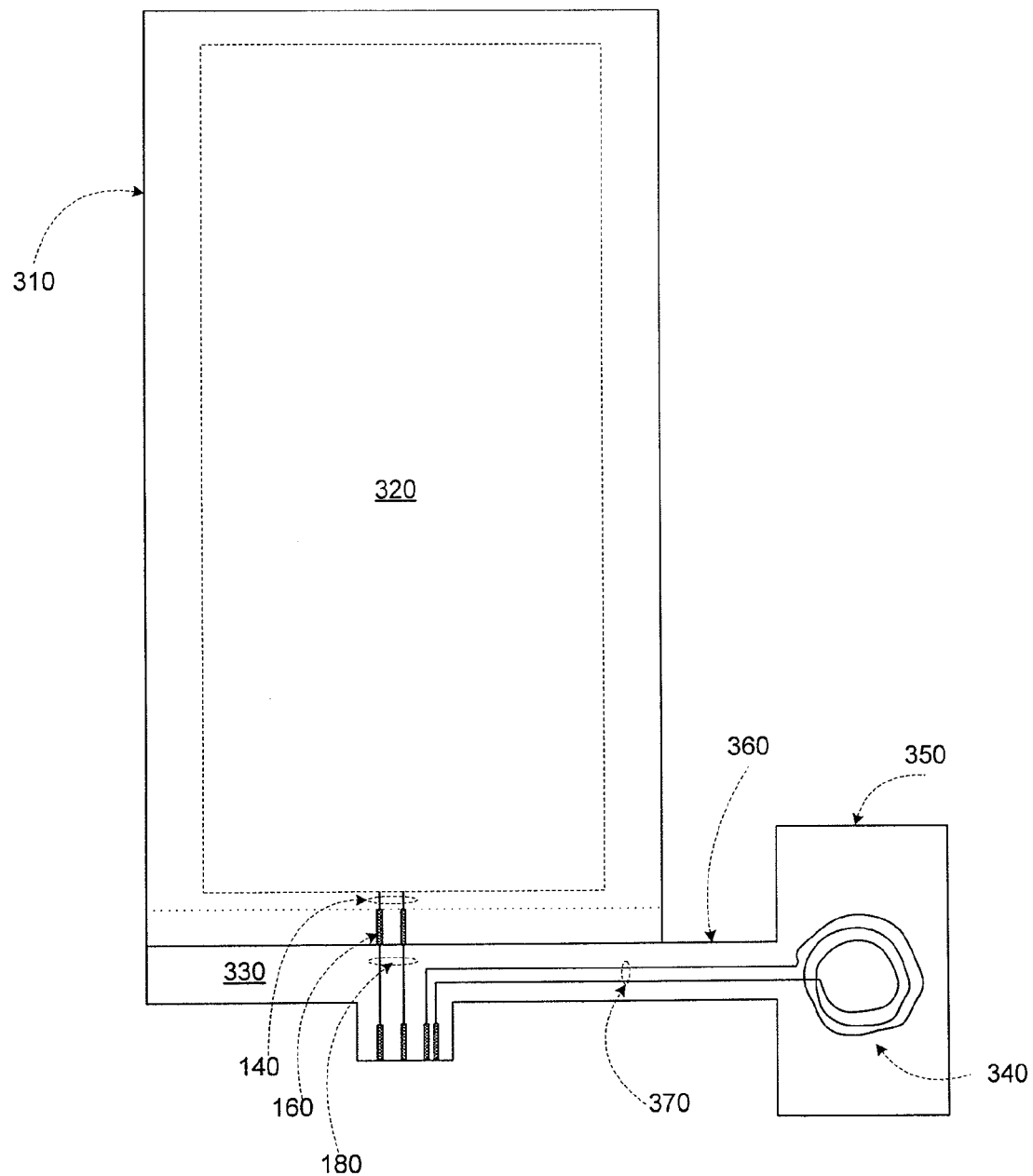
FIG. 3 illustrates an inductive-charging component on a flexible printed circuit (FPC) bonded to a touch-sensor substrate.
Figure 5:
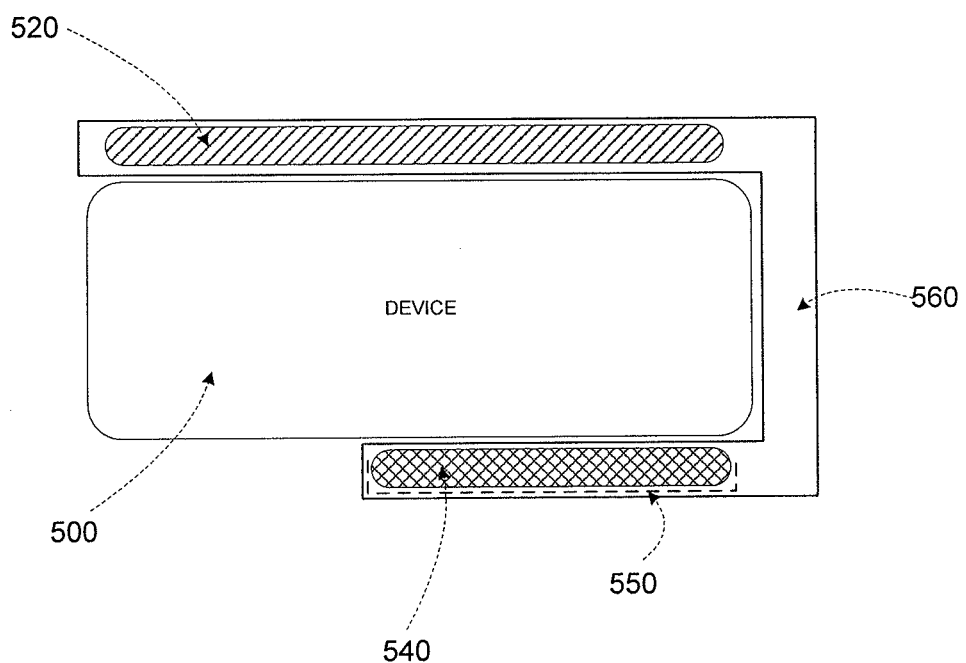
FIG. 5 is a schematic diagram of an inductive-charging component disposed on a flexible material.

FIG. 3 (which is not necessarily drawn to scale) illustrates an inductive-charging component 340 on a FPC 330 bonded to a touch-sensor substrate 310. As provided in FIG. 3, there is a touch-sensitive area 320 on touch-sensor substrate 310. Pad 350 provides an area for inductive-charging component 340 and is physically connected to FPC 330 by extension 360. FPC 330, pad 250, and extension 260 are made of the same material and formed from a contiguous segment of the material. The material of FPC 330, pad 350, or extension 360 is substantially flexible in one or more places, enabling one or more portions of pad 350 or extension 360 to substantially wrap around one or more edges of a device containing touch-sensor substrate 310 and FPC 330, from one surface of the device to another. An example of an extension 360 or a pad 350 wrapping around one or more edges of a device is illustrated in FIG. 5.

Pad 350 is polygonal (such as for example square or rectangular) in shape and has surface area for accommodating inductive-charging component 340. In particular embodiments, the use of pad 350 to provide an area for inductive-charging component 340 saves space and materials and facilitate its manufacture as compared to a device without pad 350. Wires 370 (one or more portions of which are made of the same material as inductive-charging component 340) extend across extension 360 and FPC 330, and electrically couple inductive-charging component 340 to device electronics for powering the device, or charging or otherwise managing the operation of one or more batteries or other components of a device containing touch-sensor substrate 310 and FPC 330.

Although this disclosure describes and illustrates pad 350 as having a particular size and a particular shape and being made of a particular material, this disclosure contemplates pad 350 having any suitable size and any suitable shape and being made of any suitable material.

Figure 4:
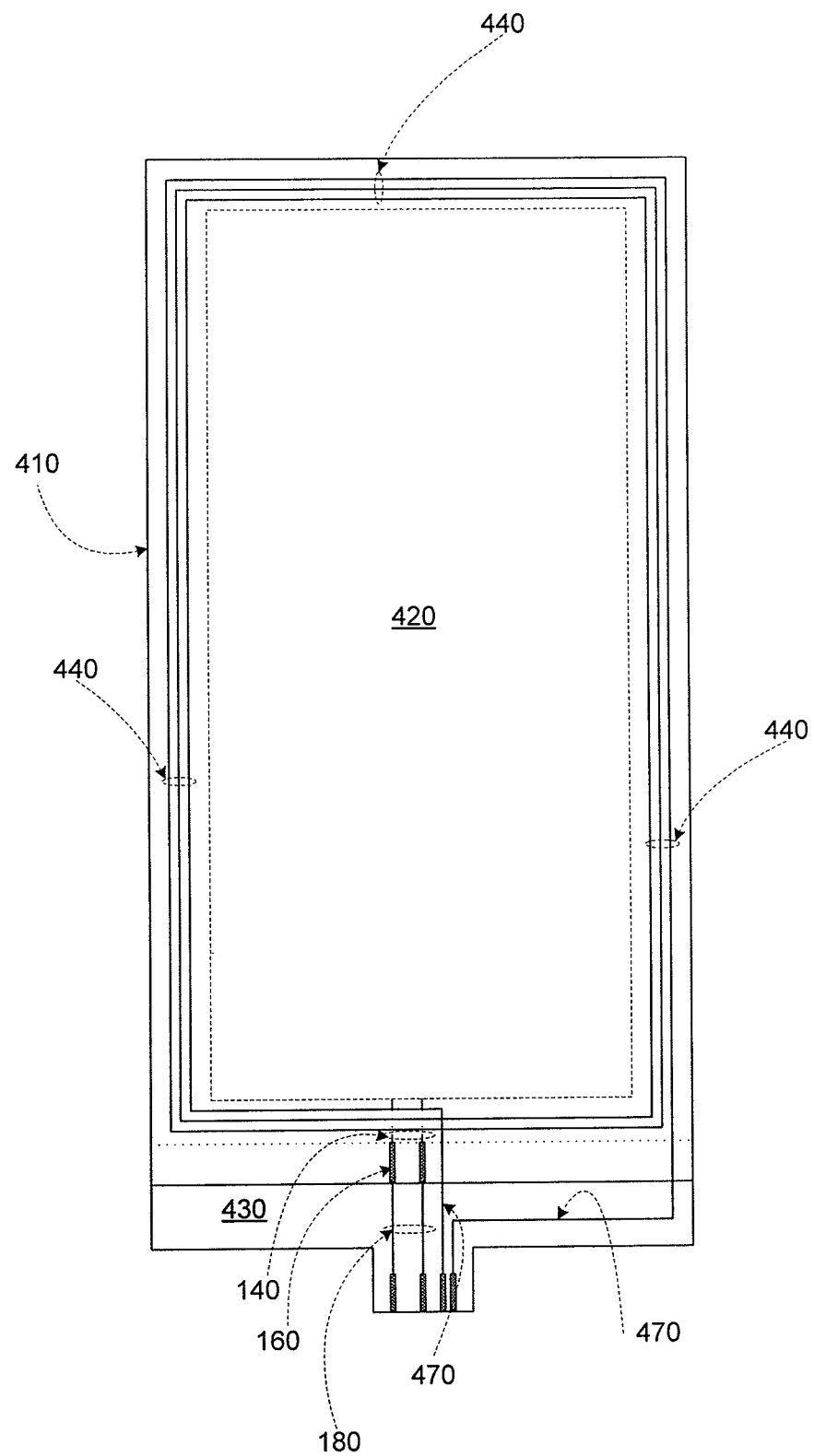
FIG. 4 illustrates an inductive-charging component on a touch-sensor substrate.

FIG. 4 (which is not necessarily drawn to scale) illustrates an inductive-charging component 440 on a touch-sensor substrate 410. As provided in FIG. 4, there is a touch-sensitive area 420 on touch-sensor substrate 410 and inductive-charging component 440 extends along the edges of touch-sensor substrate 410 outside touch-sensitive area 420. The placement of inductive-charging component 440 around touch-sensitive area 420 on touch-sensor substrate 410 in this embodiment, saves space and materials and facilitates its manufacture as compared to devices without inductive-charging component 440. Wires 470 (one or more portions of which are made of the same material as inductive-charging component 440) extend across FPC 430 and electrically couple inductive-charging component 440 to device electronics for power, or charging or otherwise managing the operation of one or more batteries or other components of a device containing touch-sensor substrate 410. In particular embodiments, where the inductive-charging component 440 and the tracks 140 of the touch sensor 10 are on the same side of the substrate, steps may be taken to prevent the tracks 140 and the inductive-charging component 440 from coming into direct electrical contact with each other. As an example and not by way of limitation, vias (openings through the substrate) can route either the tracks 140 or the inductive-charging component 440 to the other side of the substrate to prevent the tracks 140 and the inductive-charging component 440 from electrically contacting each other. As another example and not by way of limitation, a dielectric material can be placed at particular positions between the tracks 140 and the conductors of the inductive-charging component 440 to prevent the tracks 140 and the inductive-charging component 440 from electrically contacting each other. Although this disclosure describes particular device electronics providing particular functionality of a particular device, this disclosure contemplates any suitable device electronics providing any suitable functionality of any suitable device.

FIG. 5 is a schematic diagram of an inductive-charging component 540 disposed on a flexible material. As provided by FIG. 5, pad 550 and extension 560 are formed using the flexible material. Extension 560 wraps around one or more edges of device 500. As an example and not by way of limitation, extension 560 wraps around device 500 such that touch-sensitive area 520 and inductive-charging component 540 are disposed on opposite surfaces of device 500. In particular embodiments, the FPC 330, pad 550, or extension 560 is formed from the flexible material in one or more places, enabling one or more portions of pad 550 or extension 560 to substantially wrap around one or more edges of device 500, from one surface of the device to another.

Although this disclosure describes extension 560 and pad 550 wrapping around the edges of device 500 in a particular manner and configuration, this disclosure contemplates extension 560 and pad 550 wrapping around the edges of device 500 in any suitable manner and configuration. Although FIG. 5 illustrates the location of touch-sensitive area 520, pad 550, and inductive-charging component 540 relative to the substrate, this disclosure contemplates touch-sensitive area 520, pad 550, inductive-charging component 540, and any other suitable component of device 500 being in any suitable location relative to the substrate or any suitable number of substrates.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a secure digital card, a secure digital drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
    a substrate comprising a pad and an extension;
    a touch sensor disposed on the substrate, the touch sensor comprising at least one electrode made of conductive material, the extension coupling the pad to a portion of the substrate on which the touch sensor is disposed; and
    an inductive-charging component disposed on the substrate and a flexible printed circuit (FPC) comprising conductors, the FPC being distinct from the substrate and coupled to the substrate, the inductive-charging component comprising a wire disposed on the extension, the portion of the substrate on which the touch sensor is disposed, and the FPC, the inductive-charging component further comprising a coil disposed on the pad.

2. The apparatus of claim 1, wherein the FPC comprises a pad and an extension, one or more portions of the inductive-charging component being disposed on the extension and the pad of the FPC.

3. The apparatus of claim 1, wherein the conductive material comprises substantially fine lines of metal.

4. The apparatus of claim 1, wherein coupled to the FPC are one or more computer-readable non-transitory storage media that embody logic that is operable when executed to control the touch sensor, the FPC coupling the media to the touch sensor.

5. The apparatus of claim 1, wherein:
   a mobile device comprises the substrate, FPC, touch sensor, and inductive-charging component; and
   the substantially mobile device is one or more of a laptop computer, tablet computer, personal digital assistant (PDA), smartphone, portable media player, or portable game console.

6. The apparatus of claim 1, the inductive-charging component configured to convert electric power in an electromagnetic field into electric current to charge one or more batteries.

7. The apparatus of claim 1, wherein one or more portions of the inductive-charging component is made of the same conductive material as the at least one electrode.

8. The apparatus of claim 1, wherein one or more portions of the inductive-charging component is made of the same conductive material as the conductors of the FPC.

9. The apparatus of claim 1, wherein one or more portions of the inductive-charging component is made of the same material as tracks coupling the at least one electrode to the FPC.

10. An apparatus comprising:
    a substrate comprising a pad and an extension;
    a touch sensor disposed on the substrate, the touch sensor comprising at least one electrode made of conductive material, the extension coupling the pad to a portion of the substrate on which the touch sensor is disposed; and
    an inductive-charging component disposed on the substrate, one or more portions of the inductive-charging component being disposed on the extension and the pad of the substrate, the inductive-charging component comprising a wire disposed on the extension and the portion of the substrate on which the touch sensor is disposed, the inductive-charging component further comprising a coil disposed on the pad.

11. The apparatus of claim 10, wherein the conductive material comprises substantially fine lines of metal.

12. The apparatus of claim 10, further comprising one or more computer-readable non-transitory storage media that embody logic that is operable when executed to control the touch sensor.

13. The apparatus of claim 10, wherein:
    a mobile device comprises the substrate, touch sensor, and inductive-charging component; and
    the substantially mobile device is one or more of a laptop computer, tablet computer, personal digital assistant (PDA), smartphone, portable media player, or portable game console.

14. The apparatus of claim 10, the inductive-charging component configured to convert electric power in an electromagnetic field into electric current to charge one or more batteries.

15. The apparatus of claim 10, wherein one or more portions of the inductive-charging component is made of the same conductive material as the at least one electrode.

16. The apparatus of claim 10, wherein one or more portions of the inductive-charging component is made of the same material as tracks coupled to the at least one electrode.

17. An apparatus comprising:
    a substrate comprising a pad and an extension;
    a touch sensor disposed on the substrate, the touch sensor comprising at least one electrode made of conductive material, the extension coupling the pad to a portion of the substrate on which the touch sensor is disposed;
    conductive tracks configured to couple the at least one electrode to connection pads; and
    an inductive-charging component disposed on the substrate, one or more portions of the inductive-charging component being disposed on the extension and the pad of the substrate, the inductive-charging component comprising a wire disposed on the extension and the portion of the substrate on which the touch sensor is disposed, the inductive-charging component further comprising a coil disposed on the pad.

18. The apparatus of claim 17, wherein the FPC comprises a pad and an extension, one or more portions of the inductive-charging component being disposed on the extension and the pad of the FPC.

19. The apparatus of claim 17, wherein the conductive material comprises substantially fine lines of metal.

20. The apparatus of claim 17, wherein coupled to the FPC are one or more computer-readable non-transitory storage media that embody logic that is operable when executed to control the touch sensor, the FPC coupling the media to the touch sensor.

21. The apparatus of claim 17, wherein:
    a mobile device comprises the substrate, FPC, touch sensor, and inductive-charging component; and
    the substantially mobile device is one or more of a laptop computer, tablet computer, personal digital assistant (PDA), smartphone, portable media player, or portable game console.

22. The apparatus of claim 17, the inductive-charging component configured to convert electric power in an electromagnetic field into electric current to charge one or more batteries.

23. The apparatus of claim 17, wherein one or more portions of the inductive-charging component is made of the same conductive material as the at least one electrode.

24. The apparatus of claim 17, wherein one or more portions of the inductive-charging component is made of the same conductive material as the conductors of the FPC.

25. The apparatus of claim 17, wherein one or more portions of the inductive-charging component is made of the same material as tracks that couple the at least one electrode to the FPC.

* * * * *